United States Patent [19]

Victorius

[11] 4,027,066

[45] May 31, 1977

[54] THERMOSETTING POWDER COATING COMPOSITION OF AN ACRYLIC POLYMER, DODECANEDIOIC ACID, CELLULOSE ACETATE BUTYRATE AND A CROSS-LINKING AGENT

[75] Inventor: Claus Victorius, Media, Pa.

[73] Assignee: E. I. Du Pont de Nemours and Company, Wilmington, Del.

[22] Filed: Dec. 1, 1975

[21] Appl. No.: 636,794

[52] U.S. Cl. .................. 428/334; 260/15; 260/17 R; 260/21; 260/23 EP; 260/39 R; 260/39 P; 260/42.21; 260/830 R; 260/834; 260/836; 260/856; 428/335; 428/336; 428/402; 428/418; 428/457; 428/460; 428/461; 428/463; 428/327

[51] Int. Cl.² ................ B32B 15/08; B32B 27/42; C10M 5/10

[58] Field of Search .......... 428/402, 327, 418, 460, 428/461, 463, 334, 335, 336, 458, 457; 260/830 R, 834, 836, 856, 17 R, 15, 21, 23 EP, 39 R, 39 P, 42.21

[56] References Cited

UNITED STATES PATENTS

| | | | |
|---|---|---|---|
| 3,222,418 | 12/1965 | Murdock | 260/836 |
| 3,247,285 | 4/1966 | Belanger | 260/836 |
| 3,752,870 | 8/1973 | Labana | 260/836 |
| 3,770,848 | 11/1973 | Labana | 260/830 R |
| 3,773,710 | 11/1973 | Victorius | 428/460 |
| 3,781,379 | 12/1973 | Theodore | 260/830 R |
| 3,787,521 | 1/1974 | Labana | 260/836 |
| 3,846,368 | 11/1974 | Pettit | 428/402 |
| 3,857,905 | 12/1974 | Blackley | 260/835 |
| 3,876,587 | 4/1975 | Matsui | 260/823 |
| 3,880,946 | 4/1975 | Labana | 260/830 R |

*Primary Examiner*—Ellis P. Robinson

[57] ABSTRACT

A thermosetting polymer powder coating composition comprising finely divided powder particles that have a diameter of about 1–100 microns wherein the powder particles are a blend of A. an acrylic polymer of glycidyl methacrylate, an alkyl methacrylate or an alkyl acrylate having 1–12 carbon atoms in the alkyl groups, B. dodecanedioic acid, C. low viscosity cellulose acetate butyrate, D. an alkylated melamine formaldehyde crosslinking agent, and E. a blocked acid catalyst;

the powder coating composition is particularly useful as an exterior finish for automobile and truck bodies.

11 Claims, No Drawings

THERMOSETTING POWDER COATING COMPOSITION OF AN ACRYLIC POLYMER, DODECANEDIOIC ACID, CELLULOSE ACETATE BUTYRATE AND A CROSS-LINKING AGENT

BACKGROUND OF THE INVENTION

This invention is related to powder coating compositions and in particular, to a thermosetting polymer powder coating composition.

To curb pollution caused by conventional solvent based coating systems, the automobile and truck manufacturing industry intends to utilize powder coating compositions. However, the industry demands that these powder coating compositions be of a high quality.

The following patents are directed to powder coating compositions containing glycidyl methacrylate polymers:

| | |
|---|---|
| Labana U.S. Pat. No. 3,730,930 | Issued May 1, 1973 |
| Labana U.S. Pat. No. 3,752,870 | Issued Aug. 14, 1973 |
| Labana et al U.S. Pat. No. 3,770,848 | Issued Nov. 6, 1973 |
| Theodore et al U.S. Pat. No. 3,781,379 | Issued Dec. 25, 1973 |
| Labana et al U.S. Pat. No. 3,781,380 | Issued Dec. 25, 1973 |
| Blackley et al U.S. Pat. No. 3,857,905 | Issued Dec. 31, 1974 |
| Matsui et al U.S. Pat. No. 3,876,587 | Issued Apr. 8, 1975 |
| Labana et al U.S. Pat. No. 3,880,946 | Issued Apr. 29, 1975 |
| Labana et al U.S. Pat. No. 3,880,947 | Issued Apr. 29, 1975 |

Several of the above powder compositions have poor stability and readily react under normal storage conditions while others use undesirable flow control agents. In general, none of the powder compositions provide an acceptable high quality powder coating composition useful for application to the exterior of automobiles and trucks. There is a need for a storage-stable powder coating compositions that forms finishes of excellent appearance and that has good physical properties and that can withstand long periods of weathering.

SUMMARY OF THE INVENTION

The thermosetting polymer powder coating composition of this invention comprises finely divided particles that have a particle size of 1–100 microns; the particles are an intimate blend of the following constituents:

A. 55–85% by weight of an acrylic polymer of
  1. about 5–25% by weight, based on the weight of the acrylic polymer, of glycidyl methacrylate or glycidyl acrylate and
  2. about 75–95% by weight, based on the weight of the acrylic polymer, of an alkyl acrylate or an alkyl methacrylate that have 1–12 carbon atoms in the alkyl groups or a mixture of the above acrylate and methacrylate;
  wherein the acrylic polymer has a glass transition temperature of about 50°–98° C. and a weight average molecular weight of 5,000–15,000;
B. 5–15% by weight of dodecanedioic acid;
C. 5–20% by weight of cellulose acetate butyrate having a viscosity of about 0.005–1.0 seconds measured according to ASTMD-1342-56 at 25° C. and a butyryl content of about 25–60%;
D. 2–8% by weight of an alkylated melamine formaldehyde cross-linking agent having 1–4 carbon atoms in the alkyl group; and
E. 0.1–2.0% by weight of a blocked acid catalyst.

DESCRIPTION OF THE INVENTION

The thermosetting powder coating composition of this invention uses an acrylic polymer that has a glass transition temperature that provides a storage stable free-flowing powder and also provides a sufficiently low melt viscosity which allows the powder to flow on baking to an exceptionally smooth, glossy finish. The finish is of high quality and has a good appearance and good physical properties and good weathering properties as is required for the exterior finishes of automobile and truck bodies.

The thermosetting powder coating composition of this invention has powder particles that have a diameter of about 1–100 microns and preferably the powder particles are 10–75 microns in diameter to provide a high quality finish.

The particle size of the powder coating is determined by the direct measurement of the diameter of the individual powder particles under a microscope or by a Coulter Counter Instrument.

The powder particles of the powder coating can contain pigment or can be unpigmented to provide a clear finish. Generally, the powder particles are pigmented and contain up to 60% by weight, based on the weight of unpigmented powder coating, of pigment. Pigmentation can be as low as 0.1% by weight. Any of the conventional inorganic pigments, metallic powders and flakes, organic dyes, organic pigments, and lakes can be used.

About 55–85% by weight of the acrylic polymer is utilized in the powder coating composition. Also, blends of acrylic polymers can be used, such as blends of high glass transition temperature acrylic polymers and low glass transition temperature acrylic polymers. The acrylic polymer has a weight average molecular weight of about 5,000 to 15,000, preferably 8,000 to 10,000. The acrylic polymer or acrylic polymer blend has a glass transition temperature of 50° to 98° C., and preferably 60°–95° C. and more preferably 60°–70° C. The glass transition temperature is determined without the presence of a plasticizer. Acrylic polymers with the preferred molecular weight and glass transition temperature form storage-stable powders that give good quality finishes.

The weight average molecular weight of the acrylic polymers is determined by gel permeation chromotography using polystyrene as a standard.

The acrylic polymers can be prepared by conventional solution polymerization techniques in which the monomer constituents are blended with solvents and a polymerization catalyst and the reaction mixture is heated to 55°–150° C. for about 2–6 hours to form a polymer that has the aforementioned weight average molecular weight.

Typical solvents which are used to prepare the acrylic polymers are toluene, ethyl acetate, acetone, methylisobutyl ketone, methylethyl ketone, ethyl alcohol, and other esters, ethers, ketones, and alcohols, such as are conventionally used. Solvents having a boiling point below 100° C. are preferred to facilitate spray drying of a formulated composition or solvent removal by vacuum stripping of a formulated composition to form the powder coating composition. Preparations of formulated compositions used to form powder coating compositions are discussed hereinafter.

About 0.1–4% by weight, based on the weight of the monomers, of a polymerization catalyst is used to prepared the acrylic polymers. Typical catalysts are azobis-(α,gamma-dimethyl-valeronitrile), benzoyl peroxide, t-butyl peroxy pivalate, azobisisobutyronitrile and the like. Up to about 5% by weight of a chain transfer agent can be used to control the molecular weight such as dodecyl mercaptan or mercaptoethanol which is preferred to provide the acrylic polymer with terminal hydroxyl groups.

The acrylic polymers can be prepared by an emulsion polymerization process as disclosed in U.S. Pat. No. 3,790,513. The acrylic polymer can also be prepared by suspension or bead polymerization techniques as disclosed in W. R. Sorenson and T. W. Campbell, *Preparative Methods of Polymer Chemistry*, Interscience Publishers, New York, Second Ed. 1968, page 254.

Generally, the acrylic polymer utilized in the powder coating composition of this invention contains about 30–90% by weight of methyl methacrylate, 10–25% by weight of glycidyl methacrylate or glycidyl acrylate, and 0–45% by weight of an alkyl methacrylate or an alkyl acrylate each having 2–12 carbon atoms in the alkyl groups or mixtures thereof. In particular, one acrylic polymer contains 40–78% by weight of methyl methacrylate, 12–20% by weight of glycidyl methacrylate and 10–40% by weight of the aforementioned alkyl acrylate or alkyl methacrylate.

One preferred acrylic polymer that forms a high quality powder coating composition contains 42–58% by weight of methyl methacrylate, 12–18% by weight of glycidyl methacrylate and 30–40% by weight of butyl methacrylate.

One particularly useful acrylic polymer that forms a durable high quality finish is of 50% by weight of methyl methacrylate, 16% by weight of glycidyl methacrylate, and 34% by weight of butyl methacrylate.

Another useful acrylic polymer contains 75–95% methyl methacrylate and 10–25% glycidyl methacrylate or glycidyl acrylate. One preferred polymer of this type contains 82–88% methyl methacrylate and 12–18% glycidyl methacrylate. Generally, these acrylic polymers are used together with hydroxy functional plasticizers (described hereinafter) to impart flexibility to the resulting coating composition.

Typical alkyl acrylates and alkyl methacrylates having 1–12 carbon atoms in the alkyl groups that can be used to prepare the acrylic polymer are as follows: methyl acrylate, ethyl acrylate, propyl acrylate, butyl acrylate, hexyl acrylate, 2-ethylhexyl acrylate, nonyl acrylate, decyl acrylate, lauryl acrylate, methyl methacrylate, ethyl methacrylate, propyl methacrylate, butyl methacrylate, isobutyl methacrylate, hexyl methacrylate, 2-ethylhexyl methyacrylate, nonyl methacrylate, decyl methacrylate, lauryl methacrylate and the like.

A portion of the methacrylate or acrylate can be replaced with up to 30% by weight, based on the weight of the polymer of styrene or an alkyl stryene.

The powder coating composition contains 5–15% by weight, based on the weight of the film-forming constituents, of 1,12 dodecanedioic acid. The dodecanedioic acid is unique since it provides powders which are resistant to gelation during storage.

Generally, the molecular ratio of carboxyl groups of the dodecanedioic acid to epoxy groups is from about 0.8–1.5. To form a high quality composition, it is preferred to maintain this molar ratio at about 1.0–1.4.

The powder coating composition contains about 5 to 20% by weight, based on the weight of the film-forming constituents, of cellulose acetate butyrate having a viscosity of 0.005–1.0 seconds measured according to ASTM-D-1342-56 at 25° C. and a butyryl content of about 25–60% by weight. Preferably, to form a good quality finish, the cellulose acetate butyrate has a viscosity of 0.01–0.20 second and butyryl content of 50–60%. The cellulose acetate butyrate provides an excellent appearance to the finish prepared from the novel powder coating composition. The cellulose acetate butyrate is useful as a dispersant for organic pigments which often are used in the powder coating composition.

The powder coating composition contains about 2–8% by weight, based on the weight of the film-forming constituents, of an alkylated melamine formaldehyde resin having 1–4 carbon atoms in the alkyl group. These alkylated melamine resins are those that are well known in the art and are prepared by conventional techniques in which a lower alkyl alcohol such as methanol, ethanol, butanol, isobutanol, propanol, isopropanol, and the like, is reacted with the melamine formaldehyde to provide pendent alkoxy groups. One particular preferred melamine used in this invention because of its stability in the powder and since it forms a high quality coating is hexa(methoxymethyl)melamine. "Cymel" 300 and "Resimene" X-746 are highly preferred hexa(methoxymethyl)melamine resins that are used to form the powder coating composition and provide a finish with an excellent appearance.

The powder coating composition can contain up to 20% by weight of a dihydroxy functional plasticizer. Generally, about 1–15% of the plasticizer can be used. These plasticizers are cross-linked with the other constituents in the novel powder coating composition and provide a high quality film. The typical hydroxyl terminated polyesters that can be utilized have a number average molecular weight of about 1,000–4,000 and are as follows: adipic acid/butanediol/ethylene glycol; phthalic anhydride/ butanediol/ethylene glycol; and adipic acid/neopentyl glycol/ ethylene glycol and adipic acid/neopentyl glycol, isophthalic acid/azelaic acid/ethylene glycol and isophthalic acid/ azelaic acid-/adipic acid/ethylene glycol.

Hydroxyl terminated polycaprolactones can also be used as the plasticizer. These polycaprolactones have a molecular weight in the range of 520–2,000. One preferred polycaprolactone has a molecular weight of 1100–1400 and more preferably, a molecular weight of about 1250.

Up to 6% of other non-reactive monomeric and polymeric plasticizers can be used in the novel powder coating composition of this invention. Phthalate ester plasticizers in particular the alkyl and cycloalkyl ester phthalates in which the alkyl group has 2–10 carbon atoms can be used such as didecyl phthalate, butylbenzyl phthalate, dicyclohexyl phthalate, and mixtures thereof. Other esters such as dibutyl adipate and sucrose benzoate can also be used.

Non-reactive polyester resins can also be used as plasticizers. Typical polyesters are, for example, alkylene glycol esters of adipic and benzoic acid such as ethylene glycol adipate benzoate,, neopentyl glycol adipate benzoate, ethylene glycol adipate benzoate phthalate and the like. Plasticizers of oil free or oil modified alkyd resins and polyesters and epoxidized soya bean oil can also be used.

Mixtures of the above polymeric plasticizers and monomeric plasticizers can be used such as a mixture of ethylene glycol adipate benzoate and didecyl phthalate, neopentyl glycol adipate benzoate and dibutyl phthalate and the like.

About 0.1–2.0% by weight of a blocked acid catalyst is utilized in the powder coating composition. Any composition can be used which will yield free acid groups to catalyze the reaction when the powder coating composition is baked. Usually, about 0.01–1% by weight of a blocked paratoluene sulfonic acid is used. In particular, the paratoluene sulfonic acid is blocked with a low molecular weight epoxy resin such as epoxy hydroxy polyether resins. One preferred epoxy resin is ERL 4221 and has the following formula:

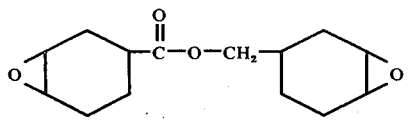

A silicone resin can be added to the powder coating composition of this invention to enhance flow and reduce cratering. Any of the conventional silicone resins or oils in amounts of 0.01–2% by weight can be used for this purpose.

Generally, the powder coating is pigmented and the following are examples of the great variety of pigments which can be used in the novel powder coating composition: metallic oxide, preferably titanium dioxide, zinc oxide, iron oxide, and the like, metallic flake, such as aluminum flake, metallic powders, metal hydroxides, "Afflair" pigments, for example, mica flake coated with titanium dioxide, sulfides, sulfates, carbonates, carbon black, silica, talc, china clay, and other extender pigments, organic pigments and lakes.

One useful composition which contains a hydroxy functional plasticizer is as follows:
- 55–77.9% by weight of an acrylic polymer of 82–88% by weight of methyl methacrylate and 12–18% by weight of glycidyl methacrylate or acrylate;
- 5–15% by weight of 1,12 dodecanedioic acid;
- 5–20% by weight of cellulose acetate butyrate;
- 4–8% by weight of hexa(methoxymethyl)melamine;
- 0.1–2.0% by weight of a paratoluene sulfonic acid catalyst blocked with the aforementioned preferred epoxy resin and
- 8–16% by weight of a hydroxy functional polyester plasticizer.

To prepare the novel powder coating composition of this invention, the acrylic polymer solution, emulsion or beads are blended with the 1,12 dodecanedioic acid, cellulose acetate butyrate, and alkylated melamine formaldehyde cross-linking agent, blocked acid catalyst along with pigments, pigment dispersions and other additives such as the aforementioned silicone resin and optionally, other plasticizers. The resulting mixture is then spray dried and the resulting power is dried in a vacuum oven for 6–36 hours. The powder then is passed through a sieve with opening of about 100 microns but generally, a 53 micron sieve is used to remove large particles.

Optionally, about 0.1–2% by weight of finely divided silica or silane treated silica can be blended with the novel powder coating composition of this invention to improve its handling and spraying properties.

The pigment dispersions utilized in making powder coating compositions of this invention are prepared by conventional techniques such as sand grinding, pebble milling, ball milling and the like of the acrylic polymer solution or dispersion of the above pigments. Generally, an organic dispersing polymer having polar groups is required to disperse the pigments.

Another method for preparing a pigment dispersion is by using a two-roll mill. Pigment chips are prepared on the two-roll mill and these chips are then formed into a pigment dispersion. Generally, the pigments and the cellulose acetate butyrate along with a small portion of a plasticizer are blended together in volatile or non-volatile solvents for the cellulose acetate butyrate. An organic polymeric dispersant can also be used for certain pigments such as carbon black pigments. The resulting mixture is placed on a two-roll mill and the mixture is thoroughly milled to disperse the pigments and form pigment chips. These chips are then blended with a solvent and additional acrylic polymers or cellulose acetate butyrate to form a pigment dispersion which is utilized as indicated above.

Application of the Powder Coating Composition

The powder coating composition of this invention is then applied to a metal, glass, plastic or fiber reinforced plastic substrate by electrostatic spraying technique or by using a fluidized bed or an electrostatic fluidized bed. Preferably, electrostatic spraying is utilized in which a negative charge of 20 to 100 kilovolts is applied to the gun. The composition is applied in several passes and then baked at 120°–180° C. for 20–60 minutes. The resulting film is about 0.5–6 mils thick but preferably 2–3 mil thick films are used to provide a good quality finish.

Preferably, the coating composition of this invention is applied over a suitably treated and primed metal substrate or a primed and sealed metal substrate. Typical alkyd primers or epoxy primers pigmented with iron oxide, carbon black, titanium dioxide and the like can be used. Conventional epoxy sealers can also be used over the primer. The novel composition can be used directly over galvanized or phosphatized steel to form a durable coating. An electrically conductive carbon black pigment preferably is added to the primer or to the sealer to make the surface conductive and promote uniform deposition of the powder while spraying.

One useful conductive sealer which can be used is an amino hydroxypropyl methacrylate acrylic polymer or a methacryloxyethyl-spirocyclohexyl oxazolidine acrylic polymer and an organic plasticizer and conductive carbon black pigment in a 10/100 to 20/100 pigment to binder ratio.

Electrodeposited primers can be used on the metal substrate. Typical electrodeposited primer compositions have as the film-forming constituents about 50–95% by weight of a carboxylic acid polymer having an acid number of 5–200 and correspondingly about 5–50% by weight of a cross-linking agent.

The following are examples of carboxylic polymers used in these primer compositions; mealeinized drying oils which are the reaction products of maleic anhydride and a drying oil such as linseed oil, dehydrated castor oil, tung oil, soya bean oil and the like; alkyd resins which are the reaction products of a polyhydric alcohol and a polybasic acid such as, drying oil fatty acids; esterified epoxy resins such as, an epoxy-hydroxy polyether resin esterified with conventional drying oil fatty acid which can be further acidified with maleinized during oils; acrylic polymers; polyesters; trimellitic anhydride alkyd resins; styrene/allyl alcohol copolymers reacted with a carboxylic acid constitutent and the like.

The following are typical cross-linking agents used with the above carboxylic polymers to form conventional primers and primers that can be electrodeposited: melamine formaldehyde, alkylated melamine formaldehyde, urea formaldehyde, benzoguanamine formaldehyde, toluene sulfonamide resins; one preferred cross-linking agent is hexa(methoxymethyl)melamine. Other cross-linking agents such as, amines and other compatible hydroxyl terminated compounds can also be used.

The following Examples illustrate the invention. All quantities, percentages and ratios are on a weight basis unless otherwise indicated.

EXAMPLE 1

An acrylic polymer solution is prepared as follows:

|  |  | Grams |
|---|---|---|
| Portion 1 |  |  |
| Methyl methacrylate monomer |  | 324.0 |
| Butyl methacrylate monomer |  | 220.3 |
| Glycidyl methacrylate monomer |  | 103.7 |
| Methylethyl ketone |  | 441.0 |
| 2-Mercaptoethanol |  | 21.6 |
|  | Total | 1110.6 |
| Portion 2 |  |  |
| Azo-bis-(alpha-gamma dimethyl valeronitrile) |  | 0.47 |
| Methylethyl ketone |  | 9.00 |
|  | Total | 9.47 |

Portion 1 is charged into a 5 liter round bottom flask equipped with a thermometer, stirrer, reflux condenser, two addition funnels, and a heating mantle; and the resulting mixture is heated to its reflux temperature; and then Portion 2 is added with stirring.

A monomer mixture and a catalyst solution are prepared as follows:

|  |  | Grams |
|---|---|---|
| Monomer Mixture |  |  |
| Methyl methacrylate monomer |  | 576.0 |
| Butyl methacrylate monomer |  | 391.7 |
| Glycidyl methacrylate monomer |  | 184.3 |
|  | Total | 1152.0 |
| Catalyst Solution |  |  |
| Methylethyl ketone |  | 316.3 |
| Azo-bis-(alpha-gamma dimethyl valeronitrile) |  | 50.6 |
|  | Total | 366.9 |

The above prepared monomer mixture and catalyst solution are premixed and added to the flask according to the following programmed addition schedule while the reaction mixture is maintained during these addition periods at its reflux temperature. The following table shows the addition of the monomer mixture and the catalyst solution starting immediately after portion 2 is added to portion 1.

| Time (Minutes) | Reactor Temperature (° C.) | Total Monomer Mixture Added (Cubic Centimeters) | Total Catalyst Solution Added (Cubic Centimeters) |
|---|---|---|---|
| 0 | 91.4 | 0 | 0 |
| 10 | 90.2 | 105 | 10 |
| 20 | 89.3 | 210 | 23 |
| 30 | 88.7 | 314 | 38 |
| 40 | 88.2 | 419 | 56 |
| 50 | 88.0 | 524 | 76 |
| 60 | 87.9 | 628 | 98 |
| 70 | 87.8 | 733 | 126 |
| 80 | 87.3 | 838 | 176 |
| 90 | 86.8 | 943 | 227 |
| 100 | 86.5 | 1047 | 289 |
| 110 | 86.2 | 1152 | 359 |
| 120 | 86.0 | 1257 | 426 |
| 130 | 85.9 | — | 427 |
| 140 | " | — | 431 |
| 150 | " | — | 435 |
| 160 | " | — | 439 |
| 170 | " | — | 444 |

After the above ingredients are added, the reaction mixture is maintained at its reflux temperature for an additional 10 minutes and then is cooled and diluted with 576 g. acetone to give a polymer solution that has a solids content of 55.1%.

The polymer is a methyl methacrylate/glycidyl methacrylate/butyl methacrylate in a weight ratio of 50/16/34. The polymer has a weight average molecular weight of 8,400 determined by gel permeation chromotography using polystyrene as a standard and has a glass transition temperature of about 62° C.

The following mill bases are prepared:

|  |  | Parts by Weight |
|---|---|---|
| White/Yellow Mill Base |  |  |
| Titanium dioxide pigment |  | 40.64 |
| Ferrite yellow orange pigment |  | 9.36 |
| Acrylic polymer solution (prepared above) |  | 17.73 |
| A-B dispersant solution (60.6% solids in methylethyl ketone of methyl methacrylate/lauryl methacrylate copolymer 92.5/7.5 weight ratio terminated with 2-mercaptoethanol and reacted with the biuret of hexamethylene diisocynate and capped with ammonia) |  | 4.12 |
| Methylethyl ketone |  | 28.15 |
|  | Total | 100.00 |

The above ingredients are thoroughly mixed together and then ground in a conventional sand mill to form a mill base having a solids content of 62.5% containing 50% pigment.

|  |  | Parts by Weight |
|---|---|---|
| Green Mill Base |  |  |
| Green pigment chips (prepared on a two-roll mill and ground and are of copper phthalocyanine green pigment/cellulose acetate butyrate, 55% butyryl content and 0.02 second viscosity/butylbenzyl phthalate in a weight ratio of 47/48/5) |  | 21.28 |
| Acrylic polymer solution (prepared above) |  | 28.37 |
| Methylethyl ketone |  | 50.35 |
|  | Total | 100.00 |

The above ingredients are mixed for about 1 hour and are charged into an Eppenbach mixer and dispersed further for about 1 hour. The resulting mill base has a solids content of about 37.3% and contains about 10% pigment.

| | Parts by Weight |
|---|---|
| Black Mill Base | |
| Carbon black chips (prepared on a two-roll mill and ground and are of carbon black pigment/cellulose acetate butyrate described above/ A-B dispersant described above in a weight ratio of 20/64/16) | 20.00 |
| Acrylic polymer solution (prepared above) | 35.46 |
| Toluene | 30.00 |
| Methylethyl ketone | 14.54 |
| Total | 100.00 |

The above ingredients are mixed for about 1 hour and are then charged into an Eppenbach mixer and dispersed further for about 1 hour to form a mill base having a solids content of about 40% and a pigment content of about 4%.

| | Parts by Weight |
|---|---|
| Midas Gold Mill Base | |
| Pigment chips (prepared on a two-roll mill and ground and are of Midas Gold pigment/cellulose acetate butyrate described above/plasticizer in a weight ratio of 50/45/5) | 16.0 |
| Cellulose acetate butyrate solution (40% solids cellulose acetate butyrate having a butyryl content of 55% and a 0.2 second viscosity in methyl ethyl ketone) | 22.0 |
| Methylethyl ketone | 62.0 |
| Total | 100.0 |

The above ingredients are mixed for about 1 hour and are then charged into an Attritor and ground for 2 hours to form a mill base having a solids content of about 24.8% and a pigment content of about 8%.

| | Parts by Weight |
|---|---|
| Maroon Mill Base | |
| Maroon pigment chips (prepared on a two-roll mill and ground and are of Perrindo maroon deep pigment, a perylene type pigment/cellulose acetate butyrate described above/ butyl phthalate in a weight ratio of 47/48/5) | 21.28 |
| Cellulose Acetate butyrate solution (described above) | 9.79 |
| Methylethyl ketone | 68.93 |
| Total | 100.0 |

The above ingredients are mixed for about 4 hours and are then charged into a pebble mill and ground for about 64 hours to form a mill base. The mill base is thinned with 24 parts of methylethyl ketone and has a solids content of about 25.4% and a pigment content of about 7.9%.

| | Parts by Weight |
|---|---|
| Magenta Mill Base | |
| Magenta Pigment Chips (prepared on a two-roll mill and ground and are of quinacridone magenta pigment/ cellulose acetate butyrate described above/butyl benzyl phthalate weight ratio of 47/48/5) | 17.02 |
| Cellulose acetate butyrate solution (described above) | 19.58 |
| Methylethyl ketone | 63.40 |
| Total | 100.00 |

The above ingredients are mixed together for several hours and then charged into a pebble mill and ground for about 64 hours to form a mill base having 24.2% solids content and a 7.8% pigment content.

| | Parts by Weight |
|---|---|
| Aluminum Flake Mill Base | |
| Aluminum flake paste (70.7% solids in ethylene glycol monoethyl ether acetate of aluminum flake treated with 3-aminopropyl triethoxysilane) | 14.14 |
| Acrylic polymer solution (prepared above) | 71.92 |
| Methylethyl ketone | 13.94 |
| Total | 110.00 |

The above ingredients are thoroughly mixed together to form a mill base having 50% solids content and a 10% pigment content.

The following liquid coating compositions are prepared:

| | Parts By Weight | |
|---|---|---|
| | Composition A Medium Green | Composition B Red Metallic |
| Portion 1 | | |
| Hex(methoxymethyl) melamine ("Resimene" X-746) | 48.0 | 48.0 |
| Benzoin | — | 6.0 |
| Silicone solution (50% solids in toluene of a low molecular weight silicone oil L-522) | 12.0 | 12.0 |
| Blocked paratoluenesulfonic acid solution (5% paratoluenesulfonic acid blocked with 6.66 times its weight of epoxy resin ERL-4221 having the aforementioned formula in isopropanol) | 6.0 | — |
| Blocked paratoluenesulfonic acid solution (12% paratoluenesulfonic acid blocked with 3 times its weight of the above epoxy resin in isopropanol) | — | 30.0 |
| Cellulose acetate butyrate (CAB) solution (40% solids in methylethyl ketone of the CAB described above) | 287.7 | 94.6 |
| Acrylic polymer solution (prepared above) | 1529.8 | 1549.4 |
| Portion 2 | | |
| White/Yellow mill base (prepared above) | 235.0 | — |
| Green mill base (prepared above) | 14.4 | — |
| Black mill base (prepared above) | 27.0 | 4.8 |
| Midas gold mill base (prepared above) | — | 105.0 |

-continued

|  | Parts By Weight | |
| --- | --- | --- |
|  | Composition A<br>Medium Green | Composition B<br>Red Metallic |
| Maroon mill base (prepared above) | — | 318.2 |
| Magenta mill base (prepared above) | — | 92.4 |
| Portion 3 | | |
| Acetone | 550.0 | 400.0 |
| Portion 4 | | |
| 1,12 Dodecanedioic acid (micronized | 138.0 | 138.0 |
| Portion 5 | | |
| Aluminum flake mill base (prepared above) | — | 48.0 |

Portion 1 is charged into a mixing vessel and thoroughly blended. Each of the mill base of Portion 2 is added in the order shown with thorough mixing with each addition of a mill base. Portion 3 is added with mixing. The mixing vessel then is placed in a water bath to keep the resulting composition cool. An Eppenbach mixer is used to mix in Portion 4 which is slowly added and then the composition is mixed for 45 minutes. In composition B, Portion 5 is added wih mixing. Both compositions are diluted with acetone to a viscosity of 40 seconds using a No. 1 Zahn Cup.

The resulting compositions have the following weight ratio of constituents: acrylic polymer/dodecanedioic acid/cellulose acetate butryate/hexa(methoxymethyl)-melamine/blocked acid catalyst Composition A — 70.5/11.5/10/4/0.193
Composition B — 70.5/11.5/10/4/1.2

Each of the compositions is spray dried by spraying the composition with a suction type gun at 55 pounds per square inch air pressure into a 30-gallon drum that is open at both ends and placed in a horizontal position. One end of the drum is covered with a 140 mesh nylon cloth to retain the powder particles and the other end of the drum with polyethylene having one opening therein through which the powder is sprayed. The powder is then placed into an unheated vacuum oven and then dried for about 48 hours. The powder then is passed through a 270 mesh screen. The resulting powders are non-caking even after being exposed to 35° C. for 1 week.

After heat aging each of the powders for 1 month at 49° C., powder composition A retained 88% of its original melt flow and composition B retained 100% of its original melt flow, both melt flows being measured at 177° C. This test shows that both powders have good chemical stability.

Each of the powders is then sprayed onto separate 20 gauge phosphatized steel panels primed with an alkyd resin type primer and sealed with a conductive sealer of an acrylic polymer pigmented with carbon black pigment. A GEMA type 721 electrostatic powder gun is used to apply the powder to the panel and the panel is prebaked for 4 minutes at 143° C. The baking temperature is raised to about 177° C. over a 10 minute period and baked for 30 minutes at 177° C.

The panel coated with powder composition A has a film thickness of about 2.5 mils, a gloss measured at 20° of about 80, a Tukon hardness of 12.4 Knoops, a distinctness of image of about 6, a Gravelometer chip resistance at −18° C. of 6, an EASFT* of 58° C., good resistance to blistering and loss of adhesion caused by humidity, excellent humidity/cold crack resistance, very good acid spot resistance and excellent saponification resistance.

*EASFT — Egg albumin spot free temperature — is the highest temperature at which a standard aqueous solution of egg albumin does not distort the coating after being dried. The coated panel being tested is placed on a thermal gradient bar for 6 minutes and then washed with water and examined for distortion of the coating. The lowest temperature at which the coating is free of distortion is recorded at the EASFT temperature.

The panel coated with powder composition B has a film thickness of about 2.5 mils, a gloss measured at 20° of about 66–67, a Tukon hardness of about 12.3 Knoops, an EASFT of about 75° C., a Gravelometer chip resistance at −18° C. of about 6, good resistance to blistering and loss of adhesion caused by humidity, excellent humidity/cold crack resistance, very good acid spot resistance and excellent saponification resistance.

EXAMPLE 2

The following constituents are blended together to form a premix:

|  | Parts by Weight |
| --- | --- |
| Acrylic polymer solution (prepared in Example 1) | 1426.6 |
| Cellulose Acetate Butyrate Solution (described in Example 1) | 270.0 |
| Hexa(methoxymethyl)melamine | 43.2 |
| Low Molecular weight silicone oil L-522 | 5.4 |
| Acetone | 414.8 |
| Total | 2160.0 |

The following liquid coating compositions are prepared:

|  | C | D | E | F |
| --- | --- | --- | --- | --- |
| Premix (prepared above) | 300.00 | 300.00 | 300.00 | 300.00 |
| Blocked paratoluenesulfonic acid solution (5% paratoluenesulfonic acid blocked with eight times its weight of ERL 4221 Epoxy resin in isopropanol) | 3.00 | 3.00 | 3.00 | 3.00 |
| 1,12 dodecanedioic acid | 17.25 | — | — | — |
| Sebacic | — | 15.15 | — | — |
| Azelaic Acid | — | — | 14.1 | — |
| Adipic Acid | — | — | — | 10.95 |

In each of the compositions D, E and F the moles of acid used are the same as the moles of dodecanedioic acid used in composition C.

Compositions C, E and F are charged into an Eppenbach mixer and mixed for about 10–30 minutes. An 80/20 methanol toluene solution is added to composition D to dissolve the sebacic acid and then composition D is charged into an Eppenbach mixer and thoroughly mixed. Each of the resulting compositions is diluted with acetone to a 40 second No. 1 Zahn cup viscosity. Each of the compositions is spray dried as in Example 1 to form a powder. The powder is dried and sieved as in Example 1.

A comparison is made in which a sample of each of the powder compositions C, D, E and F is placed in an oven and heat aged at 49° C. A second control sample of each of the powder compositions is placed in a cold room at 16° C. The melt flow of the samples held at 49° and at 16° C. are determined at 3, 7, 14 and 28 days. Melt flow of the powder sample is determined by an inclined plane test in which the sample is heated to 177° C. and the flow is measured. The melt flow of the heat aged sample is divided by the melt flow of the control sample and multiplied by 100 to give a percentage. The results of the comparison are as follows:

| | % Melt Flow Retained by Powder Samples Heat Aged at 50° C. | | | |
|---|---|---|---|---|
| Days | Sample C | Sample D | Sample E | Sample F |
| 3 | 109 | 106 | 80 | 100 |
| 7 | 100 | 76 | 0 | 42 |
| 14 | 90 | 43 | 0 | 0 |
| 28 | 78 | 0 | — | — |

Powder Sample C which contained the 1, 12 dodecanedioic acid retained its melt flow characteristics after 28 days exposure at elevated temperatures. Powder samples D, E and F did not retain their melt flow characteristics which indicates that the powders are not stable under elevated temperatures but react and gel at these temperatures as indicated by the complete loss of melt flow.

EXAMPLE 3

A liquid coating composition is prepared as follows:

| | Parts by Weight |
|---|---|
| Portion 1 | |
| 1,12 dodecanedioic acid | 44.0 |
| Hexa(methoxymethyl)melamine | 18.0 |
| Silicone solution (50% solids in toluene of a low molecular weight silicone oil) | 2.4 |
| Acrylic Polymer Solution (prepared according to the procedure of Example 1 having 53.8% solids of a polymer of methylmethacrylate/ butyl acrylate/glycidyl methacrylate in a weight ratio of 60/25/15 having a weight average molecular weight of about 11,000 and a glass transition temperature of 60° C. in a solvent of methylethyl ketone/toluene) | 282.7 |
| Acrylic polymer solution (prepared according to the procedure of Example 1 having 54.7% solids of a polymer of methyl methacrylate/ glycidyl methacrylate in a weight ratio of 85/15 having a weight average molecular weight of about 8700 and a glass transition temperature of 95° C. in a solvent of methylethyl ketone/acetone) | 204.8 |
| Portion 2 | |
| Cellulose acetate butyrate (having a butyryl content of about 55% and a viscosity of about 0.02 measured at 25° C. according to ASTMD-1343-56) | 58.6 |
| Portion 3 | |
| White/yellow mill base (prepared in Example 1) | 78.6 |
| Green mill base (prepared in Example 1) | 3.6 |
| Black mill base (prepared in Example 1) | 8.0 |
| Portion 4 | |
| Blocked paratoluene sulfonic acid catalyst solution (5% paratoluene sulfonic acid blocked with eight times its weight of Epon 812 glycerol glycidyl ether resin in isopropanol) | 8.0 |
| Total | 708.7 |

Portion 1 is charged into a mixing vessel and thoroughly blended. Portion 2 is added and thoroughly mixed with Portion 1. Each of the mill bases of Portion 3 is added in the order shown with thorough mixing of each mill base. Portion 4 is added with mixing and the vessel is placed in a water bath to keep the resulting composition cool. An Eppenbach mixer is used to mix Portion 4.

The resulting composition is spray dried and dried in a vacuum oven and sieved as in Example 1. A sample of the resulting powder is non-caking even after exposure to 35° C. for 1 week.

The powder is sprayed onto a steel panel primed with an alkyd resin primer and sealed with an acrylic sealer containing carbon black pigment and baked at 177° C. for 43 minutes. The resulting finish has a good appearance, is 2.4 mils thick, has a gloss measured at 20° of 82, a distinctness of image of 6, a Tukon Hardness of 12 Knoops, an EASFT of 60° C. and is resistant to xylene. After exposing a panel for 9 months in Florida, 96% of its original gloss is retained.

A sample of the powder is heat aged as in Example 2 but after 30 days retained 86% of its melt flow which indicates that the powder is stable.

EXAMPLE 4

An acrylic polymer solution is prepared as follows:

| Portion 1 | | Grams |
|---|---|---|
| Methyl methacrylate monomer | | 534.4 |
| Glycidyl methacrylate monomer | | 101.8 |
| Methylethyl ketone | | 441.8 |
| 2-Mercaptoethanol | | 21.2 |
| | Total | 1099.2 |
| Portion 2 | | |
| Azo-bis-(alpha-gamma-dimethyl-valeronitrile) | | 0.56 |
| Methylethyl ketone | | 3.53 |
| | Total | 4.09 |

Portion 1 is charged into a 5 liter round bottom flask equipped with a thermometer, stirrer, reflux condenser, two addition funnels, and a heating mantle; and the resulting mixture is heated to its reflux temperature; and then Portion 2 is added with stirring.

A monomer mixture and a catalyst solution are prepared as follows:

| | | Grams |
|---|---|---|
| Monomer Mixture | | |
| Methyl methacrylate monomer | | 950.0 |
| Glycidyl methacrylate monomer | | 181.0 |
| | Total | 1131.0 |
| Catalyst Solution | | |
| methylethyl ketone | | 352.7 |
| Azo-bis-(alpha-gamma-dimethyl-valeronitrile) | | 56.4 |
| | Total | 409.1 |

The above prepared monomer mixture and catalyst solution are premixed and added to the flask according to the following programmed addition schedule while the reaction mixture is maintained during these addition periods at its reflux temperature. The following table shows the addition of the monomer mixture and the catalyst solution starting immediately after portion 2 is added to portion 1.

| Time (Minutes) | Reactor Temperature (° C.) | Total Monomer Mixture Added (Cubic Centimeters) | Total Catalyst Solution Added (Cubic Centimeters) |
|---|---|---|---|
| 0 | 89.0 | 0 | 0 |
| 10 | 88.5 | 95 | 10 |
| 20 | 88.0 | 195 | 25 |
| 30 | 88.0 | 292 | 39 |
| 40 | 87.5 | 385 | 60 |
| 50 | 87.5 | 490 | 74 |
| 60 | 87.3 | 582 | 98 |
| 70 | 87.0 | 685 | 127 |
| 80 | 85.2 | 779 | 188 |
| 90 | 85.0 | 876 | 244 |
| 100 | 85.0 | 973 | 323 |
| 110 | 84.2 | 1071 | 401 |
| 120 | 84.0 | 1168 | 475 |
| 130 | 84.1 | — | 477 |
| 140 | 84.2 | — | 483 |
| 150 | 84.2 | — | 489 |
| 160 | 84.2 | — | 495 |
| 170 | 84.2 | — | 500 |

After the above ingredients are added, the reaction mixture is maintained at its reflux temperature for an additional 10 minutes and then is cooled and diluted with 420.3 g. acetone to give a polymer solution that has a solids content of 58.0%.

The polymer is a methyl methacrylate/glycidyl methacrylate/copolymer in a weight ratio of 84/16. The polymer has a weight average molecular weight of 9,400 determined by gel permeation chromotography using polystyrene as a standard and has a glass transition temperature of about 94° C.

The following liquid coating composition is prepared:

| | Parts by Weight |
|---|---|
| Portion 1 | |
| Polyester Plasticizer (hydroxy terminated polyester of ethylene glycol/azelate/isophthalate/adipate having a hydroxyl number of 110) | 46.0 |
| Hexa(methoxymethyl) melamine | 22.0 |
| Benzoin | 2.0 |
| Low molecular weight silicone oil L-522 | 2.0 |
| Blocked paratoluenesulfonic acid solution (10% paratoluenesulfonic acid blocked with three times its weight of ERL 4221 epoxy resin in isopropanol) | 4.0 |
| Stannous octoate solution (5% stannous octoate in methyl ethyl ketone) | 1.6 |
| Cellulose acetate butyrate solution (described in Example 1) | 100.0 |
| Acrylic polymer solution (prepared above) | 441.4 |
| Acetone | 200.0 |
| Portion 2 | |
| 1,12 Dodecanedioic Acid (micronized) | 36.0 |

Portion 1 was charged into a mixing vessel and thoroughly blended. The mixing vessel is then placed in a water bath to keep the resulting composition cool. An Eppenbach mixer is used to mix in Portion 2 which is slowly added and then the composition is mixed for 30 minutes. The composition is reduced with acetone to a viscosity of 40 seconds using a No. 1 Zahn cup.

The resulting composition has the following weight ratio of constituents: acrylic polymer/polyester/cellulose acetate butyrate/dodecanedioic acid/hexa(methoxy)methyl melamine/blocked acid catalyst. 64/11.5/10/9/5.5/0.4

The composition is spray dried and dried in a vacuum oven and sieved as in Example 1. A sample of the resulting powder is non-caking after exposure to 38° C. for 2 weeks.

The powder is sprayed onto a steel panel primed with an alkyd resin primer and sealed with an acrylic sealer containing carbon black pigment and baked at 177° C. for 42 minutes. The resulting clear finish has a good appearance, is 2.5 mils thick, has a distinctness of image of 5+, a Tukon Hardness of 14 Knoops, is resistant to xylene and has excellent humidity cold crack resistance.

The invention claimed is:

1. A thermosetting polymer powder coating composition comprising finely divided particles having a particle size of about 1–100 microns; wherein the particles are an intimately mixed blend of constituents consisting essentially of about
  A. 55–85% by weight of an acrylic polymer consisting essentially of
    1. about 5–25% by weight, based on the weight of the acrylic polymer, of glycidyl methacrylate or glycidyl acrylate,
    2. about 75–95% by weight, based on the weight of the acrylic polymer, of an alkyl methacrylate or an alkyl acrylate each having 1–12 carbon atoms in the alkyl groups or a mixture of said alkyl methacrylate and said alkyl acrylate; and
  wherein the acrylic polymer has a weight average molecular weight of 5,000–15,000, and a glass transition temperature of 50°–98° C.;
  B. 5–15% by weight of dodecanedioic acid;
  C. 5–20% by weight of cellulose acetate butyrate having a viscosity of about 0.005–1.0 seconds measured according to ASTM-D-134356 at 25° C. and a butyryl content of about 25–60%;
  D. 2–8% by weight of an alkylated melamine formaldehyde cross-linking agent having 1–4 carbon atoms in the alkyl group; and
  E. 0.1–2.0% by weight of a blocked acid catalyst wherein the molar ratio of carboxyl groups of the dodecanedioic acid to epoxy groups of the acrylic polymer is about 0.8–1.5.

2. The powder coating composition of claim 1 containing in addition about 0.1–60% by weight, based on the weight of the film-forming constituents, of pigment.

3. The powder coating composition of claim 2 in which the acrylic polymer consists essentially of 40–78% by weight of methyl methacrylate, 12–20% by weight of glycidyl methacrylate and 10–40% by weight of an alkyl acrylate or an alkyl methacrylate each having 2–12 carbon atoms in the alkyl groups and in which the acrylic polymer has a weight average molecular weight of about 8,000–10,000 and a glass transition temperature of 60°–95° C.

4. The powder coating composition of claim 3 in which the acrylic polymer consists essentially of 42–58% by weight of methyl methacrylate, 12–18% by weight of a glycidyl methacrylate; and 30–40% by weight of butyl methacrylate.

5. The powder coating composition of claim 3 in which the cellulose acetate butyrate has a butyl content of 50–60% and a viscosity of about 0.01–0.20 seconds measured at 25° C. according to ASTM-D-1343-56.

6. The powder coating composition of claim 3 in which the alkylated melamine formaldehyde resin is hexa(methoxymethyl)melamine.

7. The powder coating composition of claim 3 in which the acid catalyst is a blocked paratoluene sulfonic acid blocked with an epoxy constituent.

8. The powder coating composition of claim 7 in which the paratoluene sulfonic acid catalyst is blocked with a low molecular weight epoxy constitutent of the formula

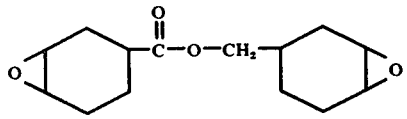

9. The thermosetting acrylic polymer powder coating composition of claim 2 comprising finely divided particles having a particle size of 10–75 microns; wherein the powder particles are an intimately mixed blend of constituents consisting essentially of
 A. an acrylic polymer consisting essentially of
  1. 42–58% by weight of methyl methacrylate,
  2. 12–18% by weight of glycidyl methacrylate,
  3. 30–40% by weight of butyl methacrylate,
 B. 1,12 dodecanedioic acid
 C. cellulose acetate butyrate having a butyryl content of 50–60% and a viscosity of 0.01–0.20 seconds measured at 25° C. according to ASTM-D-1343-56,
 D. hexa(methoxymethyl) melamine,
 E. paratoluene sulfonic acid catalyst blocked with an epoxy resin of the formula

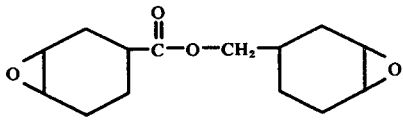

10. The thermosetting acrylic polymer powder coating composition of claim 1 comprising finely divided particles having a particle size of 10–75 microns; wherein the powder particles are an intimately mixed blend of constituents consisting essentially of
 A. 55–77.9% by weight of an acrylic polymer consisting essentially of
  1. 82–88% by weight of methyl methacrylate,
  2. 12–18% by weight of glycidyl methacrylate,
 B. 5–15% by weight of 1,12 dodecanedioic acid
 C. 5–20% by weight of cellulose acetate butyrate having a butyryl content of 50–60% and a viscosity of 0.01–0.20 seconds measured at 25° C. according to ASTM-D-1343-56,
 D. 4–8% by weight of hexa(methoxymethyl) melamine,
 E. 0.12–2.0% by weight of paratoluene sulfonic acid catalyst blocked with an epoxy resin of the formula

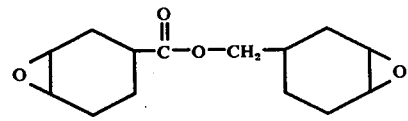

F. 8–16% by weight of a hydroxy functional polyester plasticizer.

11. A metal substrate coated with a smooth, even coalesced layer about 0.5–6 mils in thickness of the powder coating composition of claim 1.

* * * * *